United States Patent
Flandrin et al.

(10) Patent No.: US 7,778,810 B2
(45) Date of Patent: Aug. 17, 2010

(54) METHOD FOR SIMULATING FLUID FLOWS WITHIN A MEDIUM DISCRETIZED BY A HYBRID GRID

(75) Inventors: Nicolas Flandrin, Nanterre (FR); Chakib Bennis, Rueil-Malmaison (FR); Houman Borouchaki, Paris (FR); Patrick Lemonnier, Paris (FR)

(73) Assignee: Institut Francais du Petrole, Cedex (FR)

( * ) Notice: Subject to any disclaimer, the term of this patent is extended or adjusted under 35 U.S.C. 154(b) by 978 days.

(21) Appl. No.: 11/526,744

(22) Filed: Sep. 26, 2006

(65) Prior Publication Data

US 2007/0073527 A1    Mar. 29, 2007

(30) Foreign Application Priority Data

Sep. 26, 2005    (FR)    ................... 05 09914

(51) Int. Cl.
  *G06G 7/48*    (2006.01)
(52) U.S. Cl. ....................................... 703/10
(58) Field of Classification Search .............. 703/10
  See application file for complete search history.

(56) References Cited

U.S. PATENT DOCUMENTS

| | | | | |
|---|---|---|---|---|
| 5,740,342 | A * | 4/1998 | Kocberber | 345/420 |
| 6,078,869 | A * | 6/2000 | Gunasekera | 702/6 |
| 6,823,297 | B2 * | 11/2004 | Jenny et al. | 703/2 |
| 7,149,671 | B2 * | 12/2006 | Lim et al. | 703/9 |
| 2001/0006387 | A1 | 7/2001 | Bennis et al. | |
| 2005/0273303 | A1 * | 12/2005 | Flandrin et al. | 703/10 |
| 2010/0017181 | A1 * | 1/2010 | Mouton et al. | 703/9 |

FOREIGN PATENT DOCUMENTS

WO    WO 02/03263 A2    1/2002

OTHER PUBLICATIONS

Flandrin, N. et al: "3D Hybrid Mesh Generation for Reservoir flow Simulation" Proc 13$^{th}$ International Meshing Roundtable, [Online] Sep. 19, 2004, pp. 133-144, XP002383827, Williamsburg.
Flandrin, N. et al: "Diagrammes de Puissance Conformes Pour L'ingénierie de Réservoir", Mecanique & Industries EDP Sciences France, [Online], vol. 6, No. 3, May 2005, pp. 369-379, XP002383788, ISSN: 1296-2139.

* cited by examiner

*Primary Examiner*—Paul L Rodriguez
*Assistant Examiner*—Juan C Ochoa
(74) *Attorney, Agent, or Firm*—Antonelli, Terry, Stout & Kraus, LLP

(57) ABSTRACT

A method for evaluating fluid flows within a heterogeneous formation, crossed by one or more geometric discontinuities, comprising generating a hybrid grid from a CPG type grid and from structured grids having application, for example, in simulation of hydrocarbon reservoirs. The first stage locally deforms a CPG type grid into a non-uniform Cartesian grid. These local grid cell deformations correspond to the change from a so-called "CPG" frame of reference to a so-called "Cartesian" frame of reference defined by the deformation. These deformations are then quantified and applied to the structured grids so as to shift to the "Cartesian" frame. A hybrid grid is then generated in the "Cartesian" frame from the two thus deformed grids. Finally, the hybrid grid is deformed to return to the "CPG" frame, prior to improving the grid quality, by optimization under quality control in the numerical scheme sense.

21 Claims, 4 Drawing Sheets

METHOD FOR SIMULATING FLUID FLOWS WITHIN A MEDIUM DISCRETIZED BY A HYBRID GRID

BACKGROUND OF THE INVENTION

1. Field of the Invention

The present invention relates to a method for evaluating fluid flows within a heterogeneous formation, represented by a CPG type grid, and crossed by one or more geometric discontinuities represented by structured grids, comprising generating a hybrid grid from the CPG type grid and the structured grids and applies particularly for modelling the displacement of fluids such as hydrocarbons in a reservoir or in an underground reservoir crossed by one or more wells, or by fractures or faults.

2. Description of the Prior Art

During development of a hydrocarbon reservoir, it is essential to be able to simulate gas or oil production profiles in order to assess its cost-effectiveness, to validate or to optimize the position of the wells ensuring development. The repercussions of a technological or strategic change in the production of a reservoir also have to be estimated (selection of the location of new wells to be drilled, optimization and selection during well completion, . . . ). Flow simulation calculations are therefore carried out within the reservoir which allow prediction, according to the position of the wells and to certain petrophysical characteristics of the medium, such as porosity or permeability, the evolution with time of the proportions of water, gas and oil in the reservoir.

First of all, better comprehension of these physical phenomena requires 3D simulation of the multiphase flows in increasingly complex geologic structures, in the vicinity of several types of singularities such as stratifications, faults and complex wells. It is therefore essential to provide numerical schemes with a correctly discretized field of study. Generation of a suitable grid then becomes a crucial element for oil reservoir simulators because it allows description of the geometry of the geologic structure studied by means of a representation in discrete elements. This complexity has to be taken into account by the grid which has to reproduce as accurately as possible the geology and all its heterogeneities.

Furthermore, to obtain a precise and realistic simulation, the grid has to be suited to the radial directions of flow in the vicinity of the wells, in the drainage zones.

Finally, grid modelling has made great advances during the past few years in other fields such as the aviation industry, combustion in engines or structure mechanics. However, the gridding techniques used in these fields cannot be applied as they are to the petroleum sphere because the constraints are not the same. The numerical schemes are of finite difference type, which requires using a Cartesian grid, which is too simple to describe the complexity of the subsoil heterogeneities or, for most of them, of finite element type, suited to solve elliptic or parabolic problems, and not hyperbolic equations such as those obtained for the saturation. Finite difference and finite element type methods are therefore not suited for reservoir simulation, only finite volume type methods are. The latter is the most commonly used method for reservoir simulation and modelling. It discretizes the field of study into control volumes on each one of which the unknown functions are approximated by constant functions. In the case of cell-centered finite volumes, the control volumes correspond to the cells and the discretization points are the centers of these cells. The advantage of this method is that the definition of the control volumes is readily generalized to any grid type, whether structured, unstructured or hybrid. Besides, the finite volume method remains close to the physics of the problem and respects the mass conservation principle (the mass balances of the various phases are written on each cell). Furthermore, it is particularly well suited to the solution of hyperbolic type non-linear equations. It is therefore particularly suitable for solution of the hyperbolic saturation system. Therefore use is made hereafter of cell-centered finite volume methods as a basis.

In fact, the grid allowing performing reservoir simulations has to be suited to:

describe the complexity of the geometry of the geologic structure studied;

the radial directions of flow in the vicinity of the wells, in the drainage zones; and simulations by means of cell-centered finite volume type methods.

The grids proposed and used to date in the petroleum sphere are of three types: entirely structured, totally unstructured or hybrid, that is a mixture of these two grid types.

1. Structured grids are grids whose topology is fixed: each inner vertex is incident to a fixed number of cells and each cell is defined by a fixed number of faces and edges. Cartesian grids (FIG. 1) can for example be mentioned, which are widely used in reservoir simulation, as well as CPG (Corner-Point-Geometry) type grids, described for example in French Patent 2,747,490 and corresponding U.S. Pat. No. 5,844,564 filed by the assignee, and grids of circular radial type (FIG. 2) allowing the drainage area of the wells to be modelled.

2. Unstructured grids have a completely arbitrary topology: a vertex of the grid can belong to any number of cells and each cell can have any number of edges or faces. The topological data therefore have to be permanently stored to explicitly know the neighbors of each node. The memory required by the use of an unstructured grid can therefore become rapidly very penalizing. However, these grids allow description of the geometry around the wells and to represent complex geologic zones. The grids of PErpendicular BIssector (PEBI) or Voronoi type described in the following document can for example be mentioned:

Z. E. Heinemann, G. F. Heinemann and B. M. Tranta, "*Modelling Heavily Faulted Reservoirs*", Proceedings of SPE Annual Technical Conferences, pp. 9-19, New Orleans, La., September 1998, SPE.

Structured grids have already shown their limits: their structured nature facilitates their use and implementation, but this also gives them a rigidity that does not allow all the geometric complexities of the geology to be represented. Unstructured grids are more flexible and they have allowed obtaining promising results but they still are 2.5D grids, i.e. the $3^{rd}$ dimension is obtained only by vertical projection of the 2D result, and their lack of structure makes them more difficult to use.

3. To combine the advantages of the two approaches, structured and unstructured, while limiting the drawbacks thereof, another type of grid has been considered: the hybrid grid. It is a combination of different grid types and it allows obtaining the most of their advantages, while trying to limit the drawbacks thereof.

A local refinement hybrid method is proposed in:

O. A. Pedrosa and K. Aziz, "*Use of Hybrid Grid in Reservoir Simulation*", Proceedings of SPE Middle East Oil Technical Conference, pp. 99-112, Bahrain, March 1985.

This method models a radial flow geometry around a well in a Cartesian type reservoir grid. The junction between the cells of the reservoir and of the well is then achieved using hexahedral type elements. However, the vertical trajectory followed by the center of the well must necessarily be located on a vertical line of vertices of the Cartesian reservoir grid.

To widen the field of application of this method, in order to take account of the vertical and horizontal wells and of the faults in a Cartesian type reservoir grid, a new local refinement hybrid method has been proposed in:

S. Kocberber, "*An Automatic, Unstructured Control Volume Generation System for Geologically Complex Reservoirs*", Proceedings of the 14th SPE symposium on reservoir Simulation, pp. 241-252, Dallas, June 1997.

This method joins the reservoir grid and the well grid, or the reservoir grid blocks to the fault edges, by pyramidal, prismatic, hexahedral or tetrahedral type elements. However, the use of pyramidal or tetrahedral cells does not allow a cell-centered finite volume type method to be used.

Furthermore, French Patents 2,802,324 and 2,801,710 filed by the assignee describe another type of hybrid model allowing accounting, in 2D and 2.5D, the complex geometry of the reservoirs and the radial directions of flow in the neighborhood of the wells. This hybrid model allows very precise simulation of the radial nature of the flows in the neighborhood of the wells by means of a cell-centered finite volume type method. It is structured nearly everywhere, which facilitates its use. The complexity inherent in the lack of structure is introduced only where it is strictly necessary, that is in the transition zones of reduced size. Calculations are fast and account for the directions of flow through the geometry of the wells to increase their accuracy. Although this 2.5D hybrid grid provides a good step forward in reservoir simulation in complex geometries, the fact remains that this solution does not allow obtaining an entirely realistic simulation when the physical phenomena modelled are really 3D. It is the case, for example, for a local simulation around a well.

Furthermore, these hybrid grid construction techniques require creating a cavity between the reservoir grid and the well grid. S. Balaven-Clermidy describes, in "Génération de Maillages Hybrides Pour la Simulation des Réservoirs Pétroliers" (thesis, Ecole des Mines, Paris, December 2001), various methods for defining a cavity between the well grid and the reservoir grid: the minimum size cavity (by simple deactivation of the cells of the reservoir grid overlapping the well grid), the cavity obtained by expansion and the cavity referred to as Gabriel cavity. However, none of these methods is really satisfactory: the space created by the cavity does not allow the transition grid to keep an intermediate cell size between the well grid cells and the reservoir grid cells.

Finally, European patent application EP/05-291,047,8 filed by the applicant describes another hybrid type method allowing to take into account, in 2D, 2.5D and 3D, the complex geometry of the reservoirs and the radial directions of flow in the neighborhood of wells. It generates entirely automatically a cavity of minimum size while allowing the transition grid to keep an intermediate cell size between the size of the well grid cells and the size of the reservoir grid cells. This method also allows constructing a transition grid meeting the constraints of the numerical scheme used for simulation. It optimizes techniques for providing a posteriori improvement of the hybrid grid, to define a perfectly admissible transition grid in the sense of the numerical scheme selected.

This hybrid approach allows connection of a non-uniform Cartesian type reservoir grid to a circular radial type well grid. However, modelling of the reservoir by a Cartesian grid is not sufficient to account for of all the geologic complexity thereof. It is therefore necessary to use Corner Point Geometry (CPG) type structured grids to represent them. Generally, CPG grids have quadrilateral faces whose vertices are neither cospherical nor coplanar. The edges of these grids are even often non-Delaunay admissible, that is the diametral spheres of some edges are non-empty. Now, the method described above cannot manage this type of grid suitably. Current methods allowing hybrid grids to be generated are therefore no longer applicable in the precise case of CPG grids.

The method according to the invention allows construction of entirely automatically conforming transition grids when the reservoir is described by a CPG type grid.

SUMMARY OF THE INVENTION

The method according to the invention relates to a method for evaluating, in accordance with a definite numerical scheme, fluid flows in a heterogeneous medium crossed by at least one geometric discontinuity, from a hybrid grid. Generation of this grid comprises forming at least a first CPG type structured grid for gridding at least part of the heterogeneous medium and forming at least a second structured grid for gridding at least part of said geometric discontinuity, the grids being cells defined by their vertices identified by their coordinates in a so-called "CPG" frame. The method comprises the following stages:

deforming at least part of the CPG type grid into a non-uniform Cartesian grid whose vertices are then identified by their coordinates in a so-called "Cartesian" frame, defining, for each deformed cell of the CPG grid, a deformation function $\Phi$ allowing determination of the coordinates of vertices in said "CPG" frame from the coordinates of these vertices in the "Cartesian" frame;

deforming the second grid by expressing the coordinates of its vertices in the "Cartesian" frame, by means of the deformation function $\Phi$;

generating in the "Cartesian" frame a hybrid grid by constructing a conforming transition grid between the Cartesian grid and the second grid after deformation;

deforming the hybrid grid by expressing the coordinates of its vertices in the "CPG" frame, by means of said deformation function $\Phi'$ defining at least one quality criterion in relation to the numerical scheme and by means of a normal $\vec{n}$ to a face F of the transition grid, the normal being defined from said deformation function $\Phi$; and optimizing the hybrid grid in the "CPG" frame from the quality criterion.

According to the invention, the coordinates of the vertices of the second grid can be expressed in the "Cartesian" frame by carrying out the following:

seeking the coordinates, in the "CPG" frame, of the vertices of cell $\hat{H}$ of said CPG type grid containing vertex P;

defining an inverse deformation function $\Phi^{-1}$ that defines the coordinates in the "Cartesian" frame, from an iterative optimization technique and from the deformation function $\Phi$; and applying this inverse deformation function $\Phi^{-1}$ to point P.

In this case, a Newton-Raphson type iterative optimization technique can be used.

Since the faces of the cells of the CPG type grid are not plane, it may be advantageous to seek cell $\hat{H}$ that contains point P by creating a tetrahedral virtual grid from the CPG type grid. In this case, seeking cell $\hat{H}$ that contains point P can comprise seeking the virtual tetrahedron that contains point P, by means of a bucket sorting type technique for example.

According to the invention, the deformed part of the CPG type grid can correspond to a restricted zone between the first grid and the second grid, wherein the transition grid is constructed.

The coordinates of the vertices of the cells of the CPG type grid in the "Cartesian" frame can be determined from the mean distance between two vertices of a cell in the "CPG" frame.

According to the invention, the normal $\vec{\tilde{n}}$ to a face F of said transition grid can be defined as follows:

$$\vec{\tilde{n}} = \nabla \phi(G) \cdot \vec{n}$$

where $\vec{n}$ is the normal to face F in the "Cartesian" frame, G is the barycenter of F in this frame and $\Phi$ is the deformation function.

To generate the hybrid grid, at least one of the following constraints can be taken into account: conformity, convexity, orthogonality and self-centering of the cells.

Optimization of the hybrid grid can be carried out under control of quality criteria in the sense of the numerical scheme, to improve the shape regularity of the hybrid grid. The quality criteria controls can be defined as follows:

orthogonality control: a transition cell is referred to as orthogonal if its orthogonality is greater than or equal to a fixed threshold, orthogonality being defined from the normal n to a face F of the transition grid, planarity control: a transition cell is referred to as planar if its planarity is less than or equal to a fixed threshold, self-centering control: a cell is referred to as self-centered if its site is inside it.

Since the faces of the transition grid are not necessarily plane, they can be made plane under orthogonality and planarity control by displacing the vertices of these faces by iterative projection of the vertices of the faces of the grid upon their mean plane.

Finally, according to the invention, fluid flows in the heterogeneous medium can be determined from a flow simulator and by means of normal $\vec{\tilde{n}}$.

BRIEF DESCRIPTION OF THE FIGURES

Other features and advantages of the method according to the invention will be clear from reading the description hereafter, with reference to the accompanying figures wherein.

DETAILED DESCRIPTION OF THE INVENTION

Figure 1:
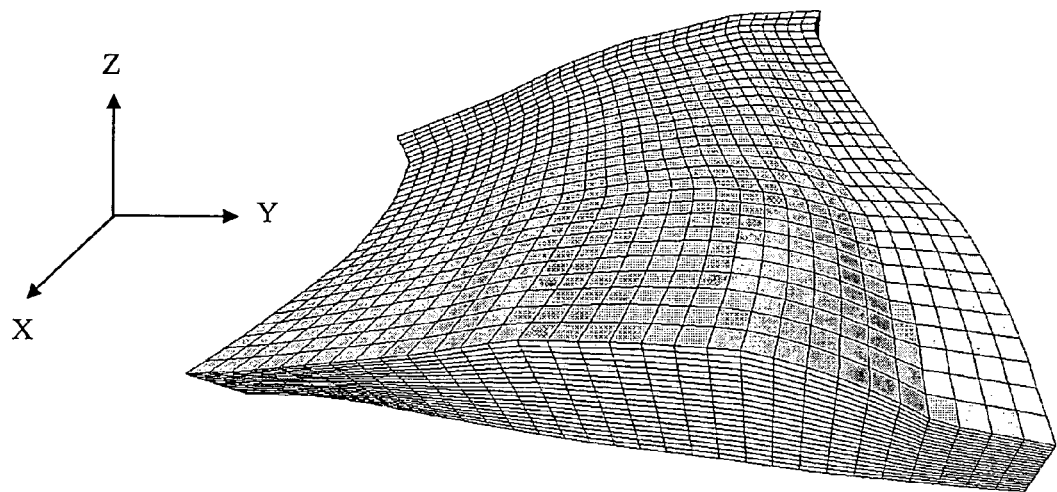
FIG. 1 shows a CPG type reservoir grid described in the "CPG" frame.

The method according to the invention allows generation of a 3D hybrid grid allowing accounting for physical phenomena occurring close to geometric discontinuities, such as wells or fractures, during reservoir simulations. This grid is, on the one hand, suited to the complexity of the geometry of the geologic structure studied and, on the other hand, to the radial directions of flow in the vicinity of the wells, in drainage zones. In the petroleum sphere, it is also necessary for these grids to be admissible in the finite volume sense. To meet this condition, the grid should have the following properties:

discretization of the flow equations is carried out by two-point approximations. This implies that, through a single face, a cell cannot have more than one neighboring cell. This property is known as conformity, to express the pressure gradient along the normal to a face, a two-point approximation between the two adjacent cells is used (numerical schemes where the flow approximation is a two-point approximation). This implies that, for each cell, a cell center (or discretization point) has to be defined. Such an approximation is therefore acceptable only if the line connecting the centers of two adjacent cells is orthogonal to their common face. This property is referred to as grid orthogonality, it immediately follows from the above property that the cells are convex, although, in theory, the discretization points can be located outside their cell, solution of the various unknowns of the flow problem compels to keep them in their cell. The cell is then referred to as self-centered and the self-centering property of the grid is referred to.

The method is presented within the particular context of the grid of a reservoir crossed by a well. Thus, from a CPG type reservoir grid and structured well grids known to specialists, the method according to the invention allows generation of a three-dimensional hybrid grid admissible in the finite volume sense.

Since conventional methods for constructing a hybrid grid cannot apply to a CPG type reservoir grid, the first stage locally deforms the CPG type reservoir grid into a non-uniform Cartesian grid. These local grid cell deformations correspond to the change from a frame referred to as "CPG" to a frame referred to as "Cartesian": the vertices of the CPG reservoir grid cells being defined in the "CPG" frame, and the vertices of the Cartesian grid cells being defined in the "Cartesian" frame. This deformation is then quantified in order to apply it to the well grid. The two grids being thus deformed and described in the "Cartesian" frame, it is possible to apply any known method to generate a hybrid grid. Finally, the last stage deforms this hybrid grid to return to the "CPG" frame.

After transferring the hybrid grid in the "CPG" frame, the cells of the power diagram obtained generally have curved (non planar) faces. An optimization procedure can then be necessary to best restore the planarity of the faces while respecting the properties relative to the finite volumes, in particular orthogonality.

It should be noted that the term "Cartesian" qualifies the "Cartesian" frame refers to the non-uniform Cartesian grid. Thus, the "Cartesian" frame is the frame wherein the coordinates of the non-uniform Cartesian grid are expressed. Similarly, the "CPG" frame is the frame wherein the coordinates of the CPG grid are expressed.

1) Quantified Deformation of the CPG Type Reservoir Grid

The first stage deforms the CPG type reservoir grid into a non-uniform Cartesian grid and in quantifying this deformation by a deformation function.

This deformation can be performed globally as described below, but it may be advantageous to carry out this deformation only in the transition zones, that is in restricted zones between the reservoir grid and the well grids.

This stage corresponds to the change from a description of the CPG grid in the "CPG" frame to the "Cartesian" frame, the CPG grid being a non-uniform Cartesian grid in the "Cartesian" frame.

This deformation, which thus generates creation of a "Cartesian" frame, is obtained by projecting the CPG grid of the reservoir upon a non-uniform Cartesian grid. Each cell of the new grid is then defined by the mean lengths of the CPG cells in the three directions X, Y and Z in space:

Let $N_X$, $N_Y$ and $N_Z$ be the number of cells of the CPG grid in the three directions of space, and let TabX(i), TabY(j), TabZ(k) be the coordinates of the vertices of indices i, j and k of the grid in the "Cartesian" frame $\forall$ (i, j, k), $1 \leq i \leq N_X+1$, $1 \leq j \leq N_Y+1$ et $1 \leq k \leq N_Z+1$.

Let TabX(1:$N_X$+1), TabY(1:$N_Y$+1) and TabZ(1:$N_Z$+1) be three charts intended to store the coordinates of the vertices of the Cartesian grid. Thus, the following procedures allow them to be determined:

```
Procedure : ConstructTabX( )
TabX(1) = 0 ;
for i = 1 to N_X do
        TabX(i+1) = 0 ;
        for j = 1 to N_Y+1 do
            for k = 1 to N_Z+1 do
                let A be the vertex of index (i, j, k) ;
                let B be the vertex of index (i+1, j, k) ;
                TabX(i+1) = TabX(i+1) + ||AB|| ;
            End for
        End for
        TabX(i+1) = TabX(i+1) / ((N_Y+1) × (N_Z+1)) ;
        TabX(i+1) = TabX(i+1) + TabX(i) ;
End for
```

In an equivalent manner in direction Y:

```
Procedure : ConstructTabY( )
TabY(1) = 0 ;
for j = 1 to N_Y do
        TabY(j+1) = 0 ;
        for i = 1 to N_X+1 do
            for k = 1 to N_Z+1 do
                let A be the vertex of index (i, j, k) ;
                let B be the vertex of index (i, j+1, k) ;
                TabY(j+1) = TabY(j+1) + ||AB|| ;
            end for
        end for
        TabY(j+1) = TabY(j+1) / ((N_X+1) × (N_Z+1)) ;
        TabY(j+1) = TabY(j+1) + TabY(j) ;
end for
```

Finally, in an equivalent manner in direction Z:

```
Procedure : ConstructTabZ( )
TabZ(1) = 0 ;
for k = 1 to N_Z do
        TabZ(k+1) = 0 ;
        for i = 1 to N_X+1 do
            for j = 1 to N_Y+1 do
                let A be the vertex of index (i, j, k) ;
                let B be the vertex of index (i, j, k+1) ;
                TabZ(k+1) = TabZ(k+1) + ||AB|| ;
            end for
        end for
        TabZ(k+1) = TabZ(k+1) / ((N_X+1) × (N_Y+1)) ;
        TabZ(k+1) = TabZ(k+1) + TabZ(k) ;
end for
```

Figure 2:
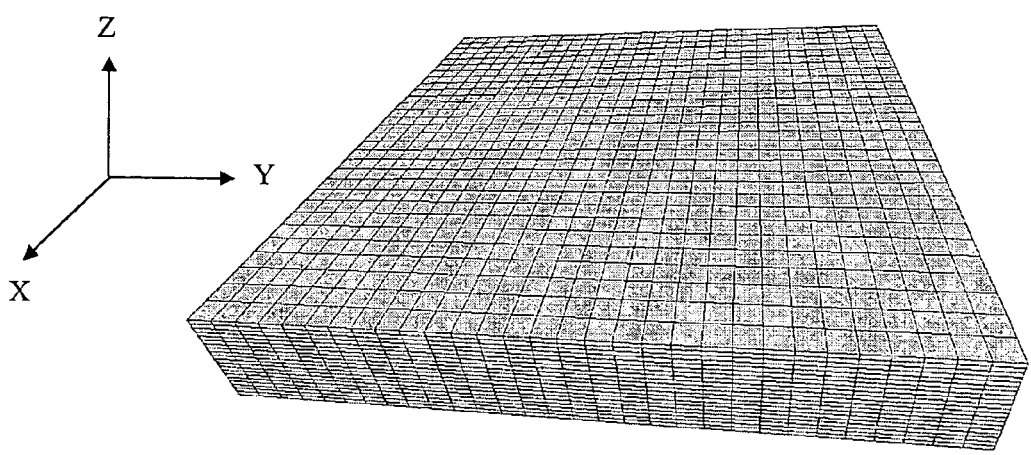
FIG. 2 shows the same grid as in FIG. 1 described in the "Cartesian" frame. This grid is then represented by a non-uniform Cartesian grid.

By way of illustration, FIG. 1 shows a CPG reservoir described in the "CPG" frame and FIG. 2 illustrates the same reservoir described in the "Cartesian" frame. The latter grid is then represented by a non-uniform Cartesian grid.

The change from the "CPG" frame to the "Cartesian" frame thus allows local deformation of cells of the CPG reservoir grid. This deformation can be performed globally, that is applied to all of the cells of the reservoir grid, or locally, that is applied to only part of the cells of the reservoir grid. It may for example be advantageous to apply a deformation only in the part necessary for construction of the transition grid, that is in restricted zones between the reservoir grid and the well grids.

After deforming the CPG type grid into a non-uniform Cartesian grid by shifting the cell vertices, i.e. by changing from the "CPG" frame to the "Cartesian" frame, this deformation has to be quantified. In fact, the change from the well grid of "CPG" frame to the "Cartesian" frame, or from the transition grid of "Cartesian" frame to the "CPG" frame, is defined by the deformation induced by the change from the CPG reservoir grid in the "CPG" frame to the Cartesian reservoir grid in the "Cartesian" frame. This deformation is local and it is defined at each hexahedral cell of the reservoir.

A deformation function $\Phi$ is therefore defined for each (in the case of a global deformation) cell of the CPG grid. This function allows going from one frame to the other, that is to determine the coordinates of the vertices in the "CPG" frame from the coordinates of these vertices in the "Cartesian" frame.

Figure 3:
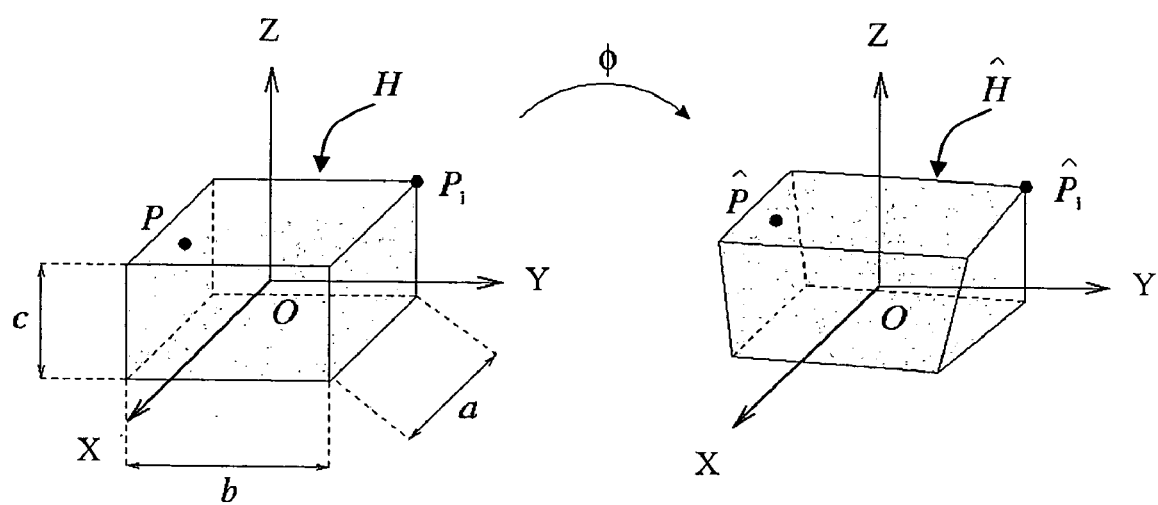
FIG. 3 illustrates the deformation, by deformation function $\Phi$, of a right-angled parallelepiped H (of vertices Pi) into any hexahedron $\tilde{H}$ (of vertices $\tilde{P}_i$)

As illustrated in FIG. 3, this deformation function $\Phi$ converts a right-angled parallelepiped H (of vertices $P_i$) to any hexahedron $\hat{H}$ (of vertices $\hat{P}_i$). To provide guidance in the construction of such a function, the property of vertices identity is introduced according to which the image of a vertex of H is a vertex of $\hat{H}$.

Let H be a right-angled parallelepiped of lengths a, b, c (FIG. 3) defined by the following eight vertices $P_1$ to $P_8$:

$$P_1 = \left(-\frac{a}{2}, -\frac{b}{2}, -\frac{c}{2}\right)$$

$$P_2 = \left(+\frac{a}{2}, -\frac{b}{2}, -\frac{c}{2}\right)$$

$$P_3 = \left(+\frac{a}{2}, +\frac{b}{2}, -\frac{c}{2}\right)$$

$$P_4 = \left(-\frac{a}{2}, +\frac{b}{2}, -\frac{c}{2}\right)$$

$$P_5 = \left(-\frac{a}{2}, -\frac{b}{2}, +\frac{c}{2}\right)$$

$$P_6 = \left(+\frac{a}{2}, -\frac{b}{2}, +\frac{c}{2}\right)$$

$$P_7 = \left(+\frac{a}{2}, +\frac{b}{2}, +\frac{c}{2}\right)$$

$$P_8 = \left(-\frac{a}{2}, +\frac{b}{2}, +\frac{c}{2}\right)$$

Then, a possible solution to the deformation quantification problem consists in defines the following deformation function $\Phi$:

$$\Phi(P) = \Phi(x, y, z) = \sum_{i=1}^{8} N_i(x, y, z) \cdot \hat{P}_i = \sum_{i=1}^{8} N_i(x, y, z) \cdot \begin{pmatrix} \hat{x}_i \\ \hat{y}_i \\ \hat{z}_i \end{pmatrix}$$

where x, y, z vary within the ranges $$\left[-\frac{a}{2}, \frac{a}{2}\right], \left[-\frac{b}{2}, \frac{b}{2}\right] \text{ and } \left[-\frac{c}{2}, \frac{c}{2}\right]$$

and $N_i$ are eight functions such that:

$$N_i(P) = N_i(x, y, z) = \begin{cases} 1 & \text{if } P = P_i \\ 0 & \text{if } P = P_j \text{ with } j \neq i \end{cases}$$

More precisely, functions $N_i$ ($1 \leq i \leq 8$) are defined by:

$$\begin{cases} N_1(P) = N_1(x, y, z) = \frac{(a-2x)(b-2y)(c-2z)}{8abc} \\ N_2(P) = N_2(x, y, z) = \frac{(a+2x)(b-2y)(c-2z)}{8abc} \\ N_3(P) = N_3(x, y, z) = \frac{(a+2x)(b+2y)(c-2z)}{8abc} \\ N_4(P) = N_4(x, y, z) = \frac{(a-2x)(b+2y)(c-2z)}{8abc} \\ N_5(P) = N_5(x, y, z) = \frac{(a-2x)(b-2y)(c+2z)}{8abc} \\ N_6(P) = N_6(x, y, z) = \frac{(a+2x)(b-2y)(c+2z)}{8abc} \\ N_7(P) = N_7(x, y, z) = \frac{(a+2x)(b+2y)(c+2z)}{8abc} \\ N_8(P) = N_8(x, y, z) = \frac{(a-2x)(b+2y)(c+2z)}{8abc} \end{cases}$$

This function $\Phi$ meets the vertices property and it changes any point P included in H to a point $\hat{P}=\Phi(P)$ included in $\hat{H}$ (FIG. 3).

It is used directly to "carry" the vertices of the transition grid from the "Cartesian" frame to the "CPG" frame, and indirectly to "carry" the vertices of the well grid from the "CPG" frame to the "Cartesian" frame.

It should be noted that the function $\Phi$ can also be written in the form $(\Phi_1, \Phi_2, \Phi_3)$ with:

$$\begin{cases} \Phi_1(x, y, z) = \sum_{i=1}^{8} N_i(x, y, z) \cdot \hat{x}_i \\ \Phi_2(x, y, z) = \sum_{i=1}^{8} N_i(x, y, z) \cdot \hat{y}_i \\ \Phi_3(x, y, z) = \sum_{i=1}^{8} N_i(x, y, z) \cdot \hat{z}_i \end{cases}$$

which can be very useful to express its Jacobian:

$$J_\varphi = \nabla \Phi = \begin{pmatrix} \frac{\partial \Phi_1}{\partial x} & \frac{\partial \Phi_1}{\partial y} & \frac{\partial \Phi_1}{\partial z} \\ \frac{\partial \Phi_2}{\partial x} & \frac{\partial \Phi_2}{\partial y} & \frac{\partial \Phi_2}{\partial z} \\ \frac{\partial \Phi_3}{\partial x} & \frac{\partial \Phi_3}{\partial y} & \frac{\partial \Phi_3}{\partial z} \end{pmatrix}$$

From deformation function $\Phi$, in order to carry a point P of the well grid or of the transition grid from a frame A to a frame B, the following is carried out:
  seeking the cell H of the reservoir in frame A that contains point P,
  defining a deformation function $\phi$ ($\Phi$ or $\Phi^{-1}$) that converts any point of cell H of frame A to the corresponding cell in frame B,
  applying this deformation function $\phi$ to point P.

The main stages of this method are thus location stages (for finding the cell of the reservoir containing a given point) and deformation operations (to go from one frame to the other).

However, the CPG cells of the reservoir grid having non-planar faces, it may be very difficult to find the hexahedral cell H containing point P, in particular for the points located near to a face. A solution to this problem creates a tetrahedral virtual grid of the reservoir, then in finding the virtual tetrahedron that contains point P.

Creation of a Tetrahedral Virtual Grid of the Reservoir

The principle divides each hexahedral cell of the reservoir into six tetrahedrons so as to have a conforming global grid. This splitting up is independent, single and it allows to create "on the spot" the tetrahedral virtual grid of each cell.

Let (1, 2, 3, 4, 5, 6, 7, 8) be the eight vertices of a hexahedron, then, by convention, it is divided into six types of tetrahedra according to the scheme as follows:

tetrahedron [1]: (1) (2) (6) (7)

tetrahedron [2]: (1) (6) (5) (7)

tetrahedron [3]: (1) (5) (8) (7)

tetrahedron [4]: (1) (3) (2) (7)

tetrahedron [5]: (1) (4) (3) (7)

tetrahedron [6]: (1) (8) (4) (7)

In addition to the indices of the four vertices thereof, a type (an integer ranging between 1 and 6) and the indices of the hexahedral cell that contains it are associated with each tetrahedron K. These two additional data then allow to "calculate on the spot" the four neighbors of K. For example, if K is tetrahedron [1] of cell (i) a) (, then the four neighbors thereof are:

neighbor [1]: tetrahedron [3] of cell (i+1) (f) (k)

neighbor [2]: tetrahedron [2] of cell (i) (j) (k)

neighbor [3]: tetrahedron [4] of cell (i) (j) (k)

neighbor [4]: tetrahedron [5] of cell (i) (j) (j-1) (k)

Seeking the Virtual Tetrahedron Containing Point P

Let P be a given point contained in the reservoir (for example a vertex of the well grid), then seeking the virtual tetrahedron containing point P is carried out as follows:
  finding vertex Q of the reservoir that is the closest to point P using a bucket sorting type technique for example;
  creating the tetrahedral virtual grid of one of the cells of the reservoir, denoted by H, having Q as the vertex;
  from a virtual tetrahedron $K_0$, $K_0 \subset H$, scanning the tetrahedral virtual grid of the reservoir using a visibility criterion (a face f is visible from point P if the power of P in relation to the support hyperplane of f is positive) until ending at tetrahedron K containing point P.

Two consecutive tetrahedrons in the path have a common face whose support hyperplane separates the first tetrahedron from point P. In this case, the path is not a single path, it is not well defined and it can be cyclic without ever reaching the tetrahedron containing point P. To avoid this situation, one of the faces of the current tetrahedron whose support hyperplane separates the tetrahedron from point P can be considered in a "random" way, if it is possible to choose. Since there always is such a path, the algorithm converges.

Deformation of the CPG grid into a uniform Cartesian grid, quantified by function $\Phi$, is then applied to the well grid.

2) Deformation of the Well Grid by Applying Inverse Deformation Function $\Phi^{-1}$ The well grid is then deformed by expressing the coordinates of its vertices in the "Cartesian" frame by means of said deformation function $\Phi$.

Construction of the well grid in the "Cartesian" frame comprises, for each vertex P, the following stages:
seeking the coordinates, in the "CPG" frame, of the vertices of cell $\hat{H}$ of the CPG type grid that contains vertex P;
defining the inverse deformation function $\Phi^{-1}$ that defines the coordinates in the "Cartesian" frame; and
applying this inverse deformation function $\Phi^{-1}$ to point P.

Since inverse deformation function $\Phi^{-1}$ cannot be described analytically, we are faced with a minimization problem that is solved by an approximation in the least squares sense.

Let $\hat{P}(\hat{x}, \hat{y}, \hat{z})$ be a point included in any hexahedron $\hat{H}$. The problem to be solved consists in defining the point P(x, y, z) included in right-angled parallelepiped H such that:

$$\Phi(P) = \hat{P}$$

$\Phi$ being the deformation function defined above)
The norm of:

$$d(P) = d(x, y, z) = \frac{1}{2}\|\Phi(P) - \hat{P}\|$$

can therefore be minimized, which amounts to equating the gradient of d to zero:

$$\nabla d(P) = J_\Phi^T(P) \cdot (\Phi(P) - \hat{P}) =
\begin{pmatrix}
\frac{\partial \Phi_1(P)}{\partial x} & \frac{\partial \Phi_1(P)}{\partial y} & \frac{\partial \Phi_1(P)}{\partial z} \\
\frac{\partial \Phi_2(P)}{\partial x} & \frac{\partial \Phi_2(P)}{\partial y} & \frac{\partial \Phi_2(P)}{\partial z} \\
\frac{\partial \Phi_3(P)}{\partial x} & \frac{\partial \Phi_3(P)}{\partial y} & \frac{\partial \Phi_3(P)}{\partial z}
\end{pmatrix}^T \cdot
\begin{pmatrix}
\Phi_1(P) - \hat{x} \\
\Phi_2(P) - \hat{y} \\
\Phi_3(P) - \hat{z}
\end{pmatrix}$$

where $J_\Phi$ is the Jacobian of $\Phi$.

In order to equate the gradient of d to zero and therefore to solve this minimization problem, a Newton-Raphson type iterative algorithm is used following the slope and the curvature of function d to go down to its minimum:

```
Procedure : Newton-Raphson( )
    let P_0 be a point of the <<Cartesian>> frame located within cell H ;
    let ε be the desired accuracy ;
    let P=P_0-(∇²d(P))⁻¹ · ∇d(P) ;
    as long as ||PP_0|| > ε do
        P_0 = P ;
        P=P_0-(∇²d(P))⁻¹ · ∇d(P) ;
    end as long as
    go back to P ;
``` where $\nabla^2 d$ is the Hessian of d:

$$H_d(P) = \nabla^2 d(P) = \begin{pmatrix}
\frac{\partial^2 d(P)}{\partial^2 x} & \frac{\partial^2 d(P)}{\partial x \partial y} & \frac{\partial^2 d(P)}{\partial x \partial z} \\
\frac{\partial^2 d(P)}{\partial y \partial x} & \frac{\partial^2 d(P)}{\partial^2 y} & \frac{\partial^2 d(P)}{\partial y \partial z} \\
\frac{\partial^2 d(P)}{\partial z \partial x} & \frac{\partial^2 d(P)}{\partial z \partial y} & \frac{\partial^2 d(P)}{\partial^2 z}
\end{pmatrix}$$

At convergence of the algorithm, the point P obtained is the point that minimizes the norm of d. It is therefore selected as the image of $\hat{P}$ through function $\Phi^{-1}$.

Figure 4:
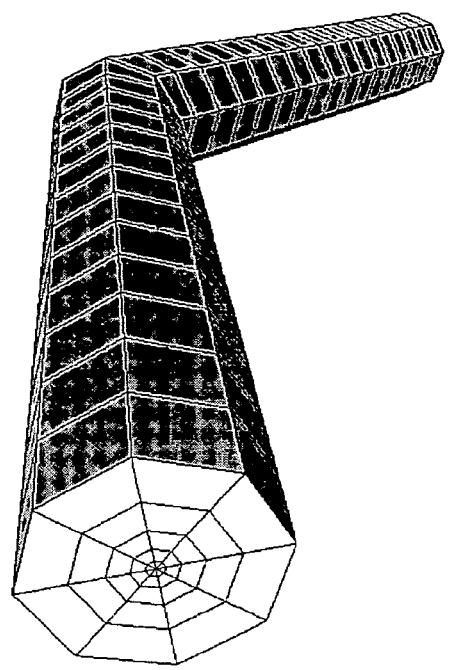
FIG. 4 illustrates a well grid in the "CPG" frame.
Figure 5:
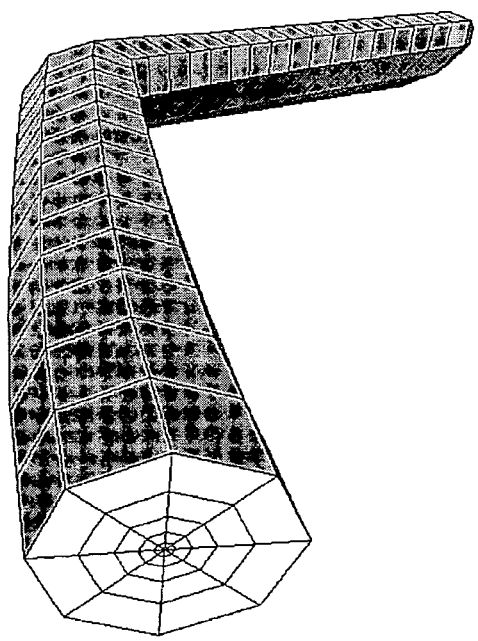
FIG. 5 illustrates the same grid as in FIG. 4 in the "Cartesian" frame, using inverse deformation function $\Phi$.

By way of illustration, FIG. 4 shows the well grid in the "CPG" frame and FIG. 5 shows the same grid obtained-in the "Cartesian" frame, using inverse deformation function $\Phi^{-1}$. The section of the well is circular in the "CPG" frame and elliptic in the "Cartesian" frame.

It should be noted that in this example, the Newton-Raphson algorithm converges after three or four iterations by taking $P_0$ in the middle of H.

3) Construction of a Hybrid Grid in the "Cartesian" Frame

The two grids being thus deformed and described in the "Cartesian" frame, it is now possible to apply all known methods for generating a hybrid grid in this "Cartesian" frame. The method described in European patent application EP-05 291 047 8 can be advantageously used. This method allows generation of a hybrid grid by combining structured grids and unstructured grids. The hybrid grid is obtained by associating a first structured grid for gridding the reservoir with second structured grids for gridding zones around wells or faults. According to this method, first a cavity is generated entirely automatically of minimum size allowing the cells of the transition grid to have an intermediate size between the size of the cells of the first grid and the size of the cells of the second grids. Then a transition grid meeting the constraints of the numerical scheme used for simulation of the fluid flows within the reservoir is constructed. Finally, the quality of the transition grid is improved by optimizing the grid under quality controls in the numerical scheme sense, in order to define a perfectly admissible transition grid in the sense of the numerical scheme selected.

4) Deformation of the Hybrid Grid by Applying Deformation Function $\Phi$

The next stage deforms the hybrid grid of the "Cartesian" frame to return to the "CPG" frame, by applying the following stages for each vertex P:
seeking the cell H of the reservoir (in the "Cartesian" frame) that contains point P;
defining deformation function $\Phi$ that converts any point of cell H of the "Cartesian" frame to the corresponding cell in the "CPG" frame; and
applying this deformation function $\Phi$ to point P.

The deformation function $\Phi$ used is the same as the function determined at each cell in stage 2.

5) Hybrid Grid Optimization

Optimization of a grid in relation to a given criterion is an operation that is frequently performed with various objectives. There are in fact many applications for such a grid optimization. In particular, optimization as such is interesting because the quality (convergence of the schemes, accuracy of the results) of the numerical solutions associated with the nodes of a grid obviously depends on the quality thereof. The method according to the invention therefore comprises, at the end of the hybrid grid generation process, an optimization stage improves the quality of the grid.

By its construction, the transition grid generated has some particular features. First, in the "Cartesian" frame, the grid has properties that were imposed (by applying a method such as the one described in European patent application EP-05 291 047 8), that is conformity, dual orthogonality and self-centering. Furthermore, the cells of the transition grid, which are cells of a power diagram, are convex by definition. The grid is thus admissible in the finite volume sense.

In the "CPG" frame, the transition grid has undergone a local deformation imposed by function Φ; it therefore no longer has the dual orthogonality property as defined in the "Cartesian" frame. This local transformation can also be seen as a metric change. The metric M at a point P is then expressed as follows:

$$M(P) = {}^t(\nabla d(P)) \cdot \nabla d(P)$$

where Φ is the deformation function defined above.

By considering this new metric in the "CPG" frame, the normal $\vec{n}$ to a face F of the transition grid is then defined by:

$$\vec{\tilde{n}} = \nabla \Phi(G) \cdot \vec{n}$$

where $\vec{n}$ is the normal to face F in the "Cartesian" frame, G is the barycenter of F in this frame and Φ is the deformation function. It converts G to $\hat{G}$, the barycenter of F in the "CPG" frame.

The normal to a face is used to calculate the flows by means of a finite volumes method and to define an orthogonality criterion.

Thus, the optimization algorithms described for example in European patent application EP-05 291 047 8, which remove an/or expand the small edges of the transition grid under admissibility control in the finite volumes sense, are directly applicable here, as well as the close vertices fusion algorithm and the algorithm for motion of the sites towards the centers of mass of the corresponding cells. The only difference lies in the definition of the orthogonality control which requires, as for the definition of the orthogonality criterion, using the new expression for the normal defined in the "CPG" frame. This consequently involves permanently managing the coordinates of the vertices of the transition grid in the "Cartesian" frame and in the "CPG" frame. Thus, when a vertex is removed or modified in the "CPG" frame, it has to be removed or modified in the "Cartesian" frame.

Most of the various quality criteria presented in European patent application EP-05 291 047 8 can be re-used directly here. In particular, the shape $Q_F$ and planarity $Q_P$ quality criteria are the same as in the Cartesian case. These quality criteria are suited to measure the quality of polyhedral cells. They are defined as follows:

Shape Quality Criterion $Q_F$

The first quality measurement $Q_F$ of a cell V is given by:

$$Q_F(V) = \min_{i=1,n}\left(\frac{l_i}{h}, \frac{h}{l_i}\right)$$

where n is the number of edges, $l_i$ is the length of the i-th edge of the cell and h is the reference length associated with V. This length h is equal to the mean length of the constraint edges associated with V. These constraint edges are the edges of the constraint quadrilaterals shared by V. This quality perfectly measures the shape or the aspect of the element according to the reference sizes of the reservoir and of the well. It can be noted that its value can range from 0, the degenerate cell having a zero edge, to 1, the regular polyhedral cell.

Planarity Criterion $Q_P$

This criterion specific to 3D is used to measure the planarity of the faces of the transition grid.

Let F be the face defined by vertices $\{A_1 \ldots A_{ns}\}$ and G the barycenter of this face. If F is split into ns triangles $T_i = (G, A_i, A_{i+1})_{i=1 \ldots ns}$, the measurement of its planarity $Q_P$ (in degrees) is given by:

$$Q_P(F) = \max_{i=1 \ldots ns}\left(ar\cos|\vec{n} \cdot \vec{n_{T_i}}| * \frac{180}{\pi}\right)$$

where $\vec{n}$ is the normal to the face and $\vec{n_{T_i}}$ the normal to triangle $T_i$.

It can be noted that $Q_P$ ranges from 0° for a perfectly plane face to 90° for a degenerate face. The planarity $Q_P$ of a cell of the transition grid V is then defined by the maximum planarity of its faces, it is expressed by:

$$Q_P(V) = \max_{F \in V} Q_P(V)$$

An Orthogonality Criterion $Q_O$

This criterion allows measuring the orthogonality of the transition grid by calculating the angle (in degrees) defined between the segment that connects the sites of two neighboring cells and the plane delimited by their common face. This orthogonality criterion $Q_o$ has to be redefined: it must in fact take account of the new expression for the normal as defined above. More precisely, if F is a polygonal face with ns sides, the measurement of its orthogonality $Q_o$ is given by:

$$Q_O(F) = \arcsin\left|\frac{\vec{PQ}}{\|\vec{PQ}\|} \cdot \vec{\tilde{n}}_F\right| \times \frac{180}{\pi}$$

where P and Q are the sites of the two cells located on either side of F and $\vec{\tilde{n}}_F$ is the normal to face F in the "CPG" frame:

$$\vec{\tilde{n}}_F = \nabla \phi(G) \cdot \vec{n}_F$$

with $\vec{n}_F$ the normal to face F in the "Cartesian" frame, G the barycenter of F in this frame and φ the transport function that converts G to $\hat{G}$, the barycenter of F in the "CPG" frame.

The orthogonality $Q_o$ of a cell of the transition grid V is then defined by the minimum orthogonality of its faces, it is expressed by:

$$Q_O(V) = \min_{F \in V} Q_o(F)$$

Faces Planarity Problems

By its construction, the generated transition grid has a second specific feature: the deformation imposed by function Φ being local, the faces of the transition grid are not necessarily plane any longer. A correction algorithm can then be used to restore this planarity.

The transition grids generated in a "Cartesian" frame generally have curved (i.e. non planar) faces. These faces can have two origins:
conformity problems due to the presence of non-cocyclic quadrilaterals at the boundary of deflected wells (in the "Cartesian" frame);
use of a trilinear interpolation function that is local and different for each vertex of the transition grid.

Now this may involve numerical calculation instabilities and therefore be harmful to the numerical simulation of flows.

To solve this problem, the invention shifts the vertices of the faces of the transition grid so as to make them planar. The final transition grid will then be admissible in the finite volume sense.

It is possible for example to use an iterative motion algorithm that projects the vertices of the faces of the transition grid upon their mean plane. Each vertex being associated with several faces, it is projected stepwise onto each face by favoring the face with the worst planarity. Since improvement in the planarity of one face can lead to a degradation in the planarity and the orthogonality of the other faces, an orthogonality and planarity control is used to validate each shift.

Let np be the number of vertices of the transition grid and n the desired number of iterations, then the algorithm used is as follows:

```
Procedure : makePlanar( )
for i = 1 to n do
    for j = 1 to np do
        let P be the jth vertex of the transition grid ;
        determine Fk (1 ≤ k ≤ nf) the nf faces of the transition grid that
        belong to the ball of vertex P ;
        let TabP(1 : nf) be a chart of nf points ;
        for k = 1 to nf do
            calculate G the barycenter of face Fk ;
            calculate n⃗ the normal to face Fk ;
```

$$TabP(k) = P - \left(\frac{\overrightarrow{GP} \cdot \vec{n}}{n}\right)\vec{n};$$

```
        end for
```

$$\text{calculate } P^* = \frac{\sum_{k=1}^{nf} Q_P(F_k) \times TabP(k)}{\sum_{k=1}^{nf} Q_P(F_k)};$$

```
        if all the faces belonging to the ball of vertex P are orthogonal
        and planar by replacing P by P* do
            replace P by P* ;
        end if
    end for
end for
```

More precisely, for each vertex P of the transition grid, all of the faces are sought that belong to the ball of this vertex. P is then projected upon each one of these faces by lending more importance to the faces that have a bad planarity ($Q_p(F_k)$ is used therefore). If the planarity and the orthogonality of these faces is better after modification, P is replaced by P*. The operation is then repeated at the next vertices.

The hybrid grid thus generated can be directly used in a flow simulator. Thus, the method according to the invention allows to simulate gas or oil production profiles so as to assess the profitability of a reservoir, to validate or to optimize the position of the wells ensuring development of the production. The method allows estimation of the repercussions of a technological or strategic change on the production of a reservoir (selection of the location of new wells to be drilled, optimization and selection during well completion, . . . ).

The method comprises generating a three-dimensional hybrid grid from CPG type grids and structured grids such as radial grids, so as to finely represent the structure and the behavior of a heterogeneous medium crossed by at least one geometric discontinuity. This hybrid grid allows accounting for physical phenomena that take place in the vicinity of geometric discontinuities such as wells or fractures, during reservoir simulations allowing to characterize fluid flows. This grid is, on the one hand, suited to the complexity of the geometry of the geologic structure studied and, on the other hand, to the radial directions of flow in the vicinity of wells, in drainage zones. Finally, the hybrid grid generated according to the invention is admissible in the finite volumes sense: it has the required conformity, orthogonality, convexity and self-centering properties.

According to the method, the hybrid grid thus generated is used in a flow simulator to model fluid displacements in the medium, by redefining the notion of normality between the faces of the grid cells. This notion is also used to define an orthogonality criterion required for optimization.

The method for generating a hybrid grid has been used within the context of the evaluation of a petroleum reservoir. It is however clear that such a hybrid grid construction technique can be used in any technical sphere requiring grids of different types (car industry, aviation industry, . . . ).

Figure 6:
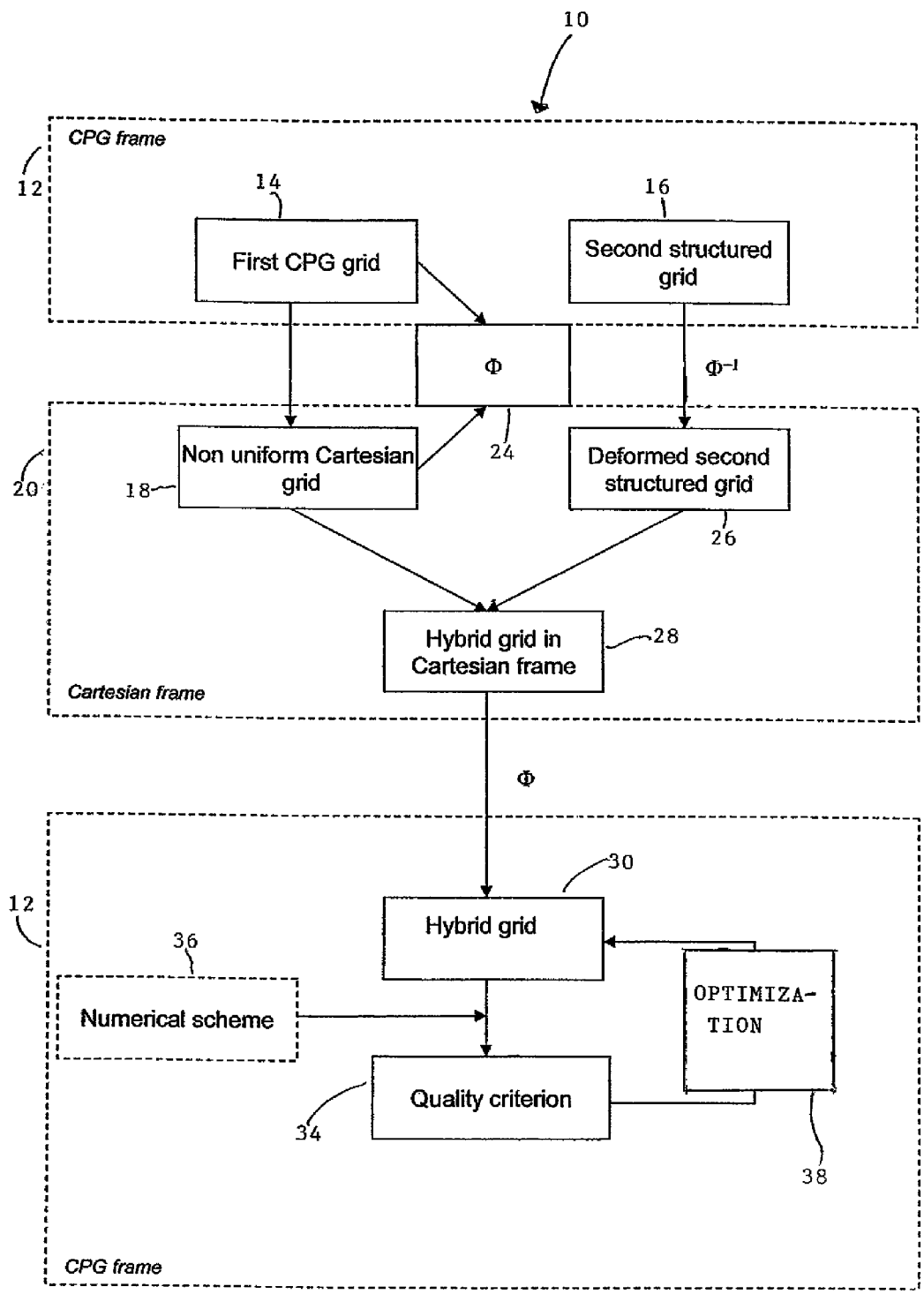
FIG. 6 illustrates the method of the present invention.

FIG. 6 illustrates a method 10 for evaluating, in accordance with a numerical scheme, fluid flows in a heterogeneous medium crossed by at least one geometric discontinuity, from a hybrid grid whose generation comprises in a CPG frame 12 forming at least a first CPG structured grid 14 for gridding at least part of the heterogeneous medium and forming at least a second structured grid 16 for gridding at least part of the geometric discontinuity. The grids 14 and 16, include cells defined by vertices thereof identified by coordinates thereof in the CPG frame 12. The method comprises deforming at least part of the CPG grid 14 into a non-uniform Cartesian grid 18 whose vertices thereof are then identified by coordinates thereof in a Cartesian frame 20. The method further includes defining, for each deformed cell of the first CPG structural grid 14 and from the non-uniform Cartesian grid 18 a deformation function Φ24 allowing determination of coordinates of vertices in the CPG frame 12 from the coordinates of vertices in the Cartesian frame; deforming the second structured grid 16 by expressing coordinates of vertices thereof in the Cartesian frame 20 by use of an inversion of the deformation function Φ24; generating in the Cartesian frame 20 a hybrid grid 28 by constructing a conforming transition grid from the non-uniform Cartesian grid 18 and the deformed second structured grid 26; deforming the hybrid grid 28 in the CPG frame 12 by expressing coordinates of vertices by use of the deformation function Φ24; defining at least one quality criteria 34 in relation to the numerical scheme 36 and by use of a normal $\vec{n}$ to face F of the conforming hybrid grid 30, the normal being defined from the deformation function Φ24; and optimizing 38 the hybrid grid in the CPG frame 12 from the at least one quality criteria.

The invention claimed is:

1. A method for evaluating, in accordance with a numerical scheme, fluid flows in a heterogeneous medium crossed by at least one geometric discontinuity, from a hybrid grid whose generation comprises forming at least a first Corner Point Geometry (CPG) structured grid for gridding at least part of the heterogeneous medium and forming at least a second structured grid for gridding at least part of the geometric discontinuity, the grids including cells defined by vertices thereof identified by coordinates thereof in a CPG frame, the method comprising:

deforming at least part of the first CPG structured grid into a non-uniform Cartesian grid whose vertices thereof are then identified by coordinates thereof in a Cartesian frame;

defining, for each deformed cell of the first CPG structured grid, a deformation function $\Phi$ from the first CPG structured grid and the non-uniform Cartesian grid allowing determination of coordinates of the vertices in the CPG frame from the coordinates of vertices in the Cartesian frame;

deforming the second structured grid by expressing coordinates of vertices thereof in the Cartesian frame, by the deformation function $\Phi$;

generating in the Cartesian frame a hybrid grid by constructing a conforming transition grid from the non-uniform Cartesian grid and the deformed second structured grid;

deforming the hybrid grid in the CPG frame by expressing coordinates of vertices thereof by use of the deformation function $\Phi$;

defining at least one quality criterion in relation to the numerical scheme by use of a normal $\vec{n}$ to a face F of the conforming transition grid, the normal being defined from the deformation function $\Phi$; and optimizing the hybrid grid in the CPG frame from the quality criterion.

2. A method as claimed in claim 1, wherein the coordinates of the vertices of the second grid in the Cartesian frame are expressed by carrying out the following:

seeking coordinates, in the CPG frame, of the vertices of a cell $\hat{H}$ of the CPG type grid containing a vertex P;

defining an inverse deformation function $\Phi^{-1}$ that defines the coordinates in the Cartesian frame, from an iterative optimization technique and from said deformation function $\Phi$;

applying the inverse deformation function $\Phi^{-1}$ to point P.

3. A method as claimed in claim 2, wherein the iterative optimization technique is of Newton-Raphson type.

4. A method as claimed in claim 2, wherein seeking cell $\hat{H}$ that contains point P comprises creating a tetrahedral virtual grid from the CPG type grid.

5. A method as claimed in claim 4, wherein seeking cell $\hat{H}$ that contains point P comprises seeking the virtual tetrahedron containing point P.

6. A method as claimed in claim 5, wherein seeking the virtual tetrahedron containing point P comprises using a bucket sorting type technique.

7. A method as claimed in claim 1, wherein the deformed part of the CPG type grid corresponds to a restricted zone between the first grid and the second grid wherein the transition grid is constructed.

8. A method as claimed in claim 1, wherein the coordinates of the vertices of the CPG type grid cells in the Cartesian frame are determined from a mean distance between two vertices of a cell in the CPG frame.

9. A method as claimed in claim 1, wherein the hybrid grid is generated by accounting for at least one of the following constraints: conformity, convexity, orthogonality and self-centering of the cells.

10. A method as claimed in claim 1, wherein a normal $\vec{n}$ to a face F of the transition grid is defined as follows:

$$\vec{n} = \nabla \phi(G) \cdot \vec{n}; \text{ and}$$

where $\vec{n}$ is the normal to face F in the Cartesian frame, G is the barycenter of F in this frame and $\Phi$ is the deformation function.

11. A method as claimed in claim 1, wherein optimization of the hybrid grid is carried out under quality criteria control in the numerical scheme to improve shape regularity of the hybrid grid.

12. A method as claimed in claim 11, wherein the quality criteria controls are defined as follows:

orthogonality control: a transition cell is orthogonal if orthogonality thereof is greater than or equal to a fixed threshold, orthogonality being defined from a normal $\vec{n}$ to a face F of the transition grid;

planarity control: a transition cell is planar if planarity thereof is less than or equal to a fixed threshold; and self-centering control: a cell is self-centered if it's a site thereof is inside the cell.

13. A method as claimed in claim 1, wherein the faces of the transition grid cells are made plane under orthogonality and planarity control by shifting vertices of the faces by iterative projection of vertices of the faces of the grid upon a mean plane of the grid.

14. A method as claimed claim 1, wherein the fluid flows in the medium are determined from a flow simulator and by means of said normal $\vec{n}$.

15. A method as claimed in claim 3, wherein seeking cell $\hat{H}$ that contains point P comprises creating a tetrahedral virtual grid from the CPG grid.

16. A method as claimed in claim 4, wherein seeking cell $\hat{H}$ that contains point P comprises seeking the virtual tetrahedron containing point P.

17. A method as claimed in claim 2, wherein the deformed part of the CPG grid corresponds to a restricted zone between the first grid and the second grid wherein the transition grid is constructed.

18. A method as claimed in claim 3, wherein the deformed part of the CPG grid corresponds to a restricted zone between the first grid and the second grid wherein the transition grid is constructed.

19. A method as claimed in claim 4, wherein the deformed part of the CPG grid corresponds to a restricted zone between the first grid and the second grid wherein the transition grid is constructed.

20. A method as claimed in claim 5, wherein the deformed part of the CPG grid corresponds to a restricted zone between the first grid and the second grid wherein the transition grid is constructed.

21. A method as claimed in claim 6, wherein the deformed part of the CPG grid corresponds to a restricted zone between the first grid and the second grid wherein the transition grid is constructed.

* * * * *